United States Patent
Gosling et al.

(10) Patent No.: US 9,774,555 B2
(45) Date of Patent: Sep. 26, 2017

(54) COMPUTER IMPLEMENTED METHODS AND APPARATUS FOR MANAGING OBJECTIVES IN AN ORGANIZATION IN A SOCIAL NETWORK ENVIRONMENT

(71) Applicant: salesforce.com, inc., San Francisco, CA (US)

(72) Inventors: Marcus Gosling, Woodside, CA (US); Maksim Ovsyannikov, San Francisco, CA (US); Austin Tam, Toronto (CA); Daniel Debow, Toronto (CA)

(73) Assignee: salesforce.com, inc., San Francisco, CA (US)

( * ) Notice: Subject to any disclaimer, the term of this patent is extended or adjusted under 35 U.S.C. 154(b) by 134 days.

(21) Appl. No.: 14/026,859

(22) Filed: Sep. 13, 2013

(65) Prior Publication Data
US 2014/0082107 A1    Mar. 20, 2014

Related U.S. Application Data

(60) Provisional application No. 61/701,281, filed on Sep. 14, 2012.

(51) Int. Cl.
| | |
|---|---|
| *G06F 15/16* | (2006.01) |
| *H04L 12/58* | (2006.01) |
| *G06Q 10/00* | (2012.01) |
| *G06Q 10/06* | (2012.01) |

(52) U.S. Cl.
CPC ............. *H04L 51/32* (2013.01); *G06Q 10/00* (2013.01); *G06Q 10/06* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Viet Vu
*Assistant Examiner* — James Edwards
(74) *Attorney, Agent, or Firm* — Weaver Austin Villeneuve & Sampson LLP

(57) ABSTRACT

Disclosed are methods, apparatus, systems, and computer readable storage media for managing objectives in an organization in a social network environment. A server may receive objective data and task data associated with the objective. A message associated with the objective may be published on a social network feed.

26 Claims, 10 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 * | 8/2004 | Achacoso ............... G06Q 10/10 709/203 |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,758 B1 | 3/2009 | Kekki |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 * | 6/2010 | Kraft ................ G06F 17/30604 707/790 |
| 7,779,039 B2 | 8/2010 | Weissman et al. |
| 7,779,475 B2 | 8/2010 | Jakobson et al. |
| 7,827,208 B2 * | 11/2010 | Bosworth ........... G06F 17/3089 707/802 |
| 7,853,881 B1 * | 12/2010 | Aly Assal .............. G06Q 10/10 715/734 |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,817,065 B1 * | 8/2014 | Mo ................... G06F 3/04842 348/14.08 |
| 2001/0044791 A1 | 11/2001 | Richter et al. |
| 2002/0072951 A1 | 6/2002 | Lee et al. |
| 2002/0082892 A1 * | 6/2002 | Raffel ................. G06Q 10/063 705/7.26 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0158512 A1 | 8/2004 | Dean et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0107265 A1* | 5/2006 | Schulz ................ G06Q 10/06 718/100 |
| 2006/0136344 A1* | 6/2006 | Jones ................ G06Q 30/06 705/402 |
| 2007/0143169 A1* | 6/2007 | Grant ................ G06Q 10/06 705/7.14 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0265199 A1* | 10/2009 | Moerdler ................ G06Q 10/00 705/7.39 |
| 2009/0300525 A1* | 12/2009 | Jolliff ................ H04M 1/72544 715/764 |
| 2009/0319344 A1* | 12/2009 | Tepper ............ G06Q 10/06393 705/7.39 |
| 2010/0010872 A1* | 1/2010 | Drummond ........ G06Q 10/0637 705/7.36 |
| 2010/0050098 A1* | 2/2010 | Turner ............ G06F 17/30038 715/763 |
| 2010/0274620 A1* | 10/2010 | Upadhyaya ............ G06Q 10/06 705/7.15 |
| 2011/0106711 A1* | 5/2011 | Goyal ................ G06Q 10/00 705/80 |
| 2011/0128281 A1* | 6/2011 | Bhogal ............... A63F 13/5372 345/419 |
| 2011/0218958 A1 | 9/2011 | Warshavsky et al. |
| 2011/0247051 A1 | 10/2011 | Bulumulla et al. |
| 2011/0320373 A1* | 12/2011 | Lee ........................ G06Q 50/01 705/319 |
| 2012/0004956 A1* | 1/2012 | Huston .............. G06Q 30/0207 705/14.1 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2012/0290950 A1* | 11/2012 | Rapaport ................ H04L 51/32 715/753 |
| 2013/0080348 A1* | 3/2013 | Pantaliano ............. G06Q 30/02 705/347 |
| 2013/0151273 A1* | 6/2013 | Jones ................. G06F 19/3456 705/2 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246112 A1 | 9/2013 | Comstock et al. |
| 2013/0247216 A1 | 9/2013 | Cinarkaya et al. |
| 2013/0262294 A1* | 10/2013 | Green ................. G06Q 20/023 705/39 |
| 2014/0288985 A1 | 9/2014 | Debow et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

U.S. Office Action dated Dec. 31, 2015 issued in U.S. Appl. No. 14/294,441.

U.S. Final Office Action dated Jun. 24, 2016 issued in U.S. Appl. No. 14/294,441.

* cited by examiner

400

Create Objective

○ Private   ○ Public    — 405

Objective Name: | Splice Unicorn DNA into Mongoose DNA | — 410

Description: | We will combine the DNA of the graceful unicorn with the DNA of the crafty mongoose to create a fantastical new beast titled the unigoose (or maybe the monicorn). | — 415

Start Date: | 09/01/2013 | — 420    End Date: | 05/01/2014 | — 425

Key Results:

| Obtain a Unicorn | — 430

| Obtain a Mongoose | — 435

| Combine Unicorn DNA with Mongoose DNA | — 440

Contributors:

| Edward Prendick | — 445

| Ling Montgomery | — 450

Message: | Let's win a Nobel Prize! | — 455

( Submit )

FIGURE 4

COMPUTER IMPLEMENTED METHODS AND APPARATUS FOR MANAGING OBJECTIVES IN AN ORGANIZATION IN A SOCIAL NETWORK ENVIRONMENT

PRIORITY DATA

This patent document claims priority to commonly assigned U.S. Provisional Patent Application No. 61/701,281, titled "System and Method for Managing Resources in a Social Network Environment", by M. Gosling, et al., filed on Sep. 14, 2012, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to the use of database objects such as objective, social network, and customer relationship management (CRM) records to manage objectives in an organization using online social networks, and more specifically, to creating or updating such database records when users interact with the social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods and computer readable media for managing objectives in an organization in a social network environment. These drawings in no way limit any changes in form and detail that may be made by one skilled in the art without departing from the spirit and scope of the disclosed implementations.

FIG. 4 shows an example of a graphical user interface (GUI) 400 for creating an objective record according to some implementations.

FIG. 7 shows an example of a graphical user interface (GUI) 700 including data from an objective record in accordance with some implementations.

DETAILED DESCRIPTION

Figure 1:
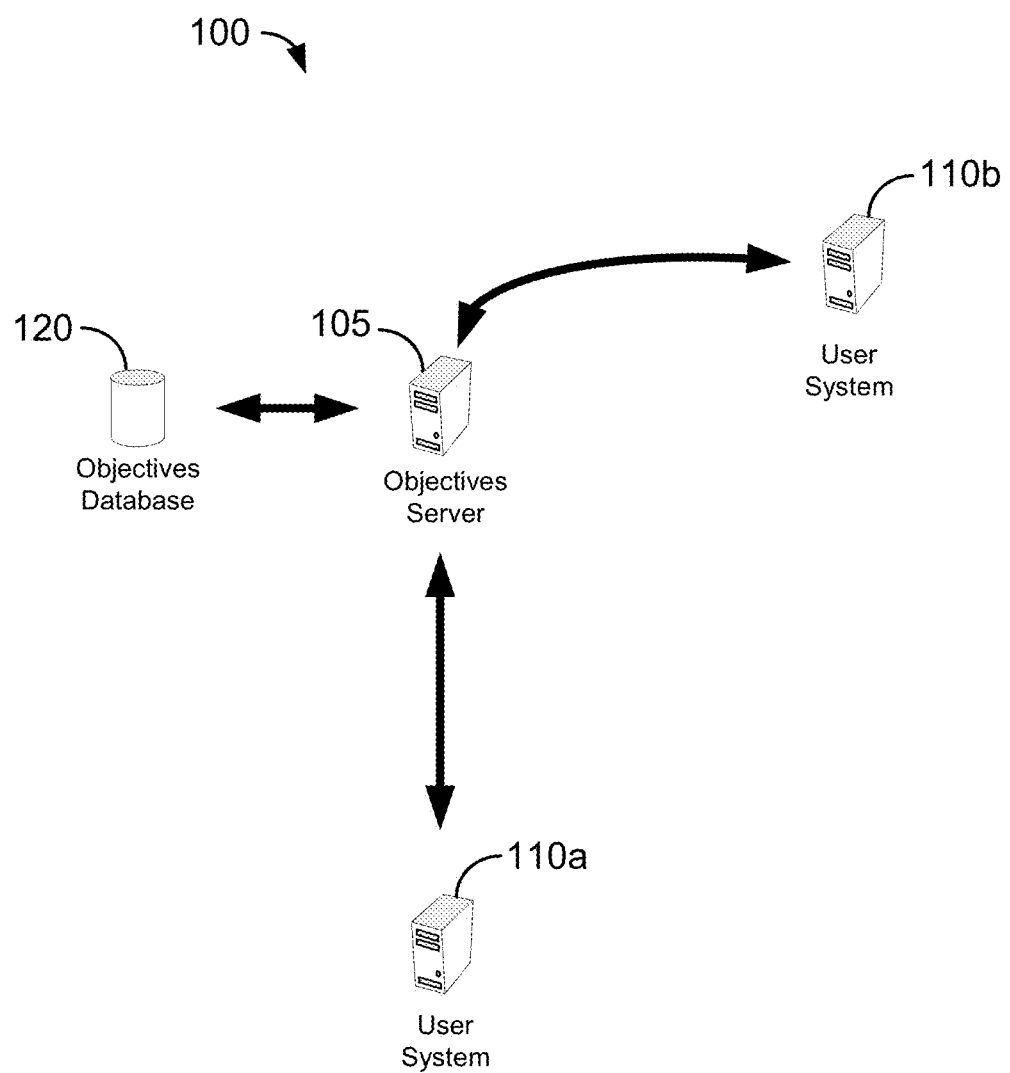
FIG. 1 shows a system diagram of an example of architectural components 100 for managing objectives in an organization in a social network environment according to some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different systems, apparatus, methods, and computer-readable storage media for creating, managing, analyzing, and joining objectives in an organization. A graphical representation of an objective can be presented as a feed item identifying the objective and published on a social network feed of an online social network. In this way, members of the organization may view, select, and proactively join selected objectives and contribute to the organization's goals in the context of a social network feed. Details regarding the objective, including a variety of tasks and/or steps which form at least a part of the objective, may be viewed. Contributors may join together to complete the objective and volunteer or be assigned to complete tasks or steps associated with the objective. Messages regarding users deciding to contribute, contributors who have accomplished tasks and/or steps, and other progress associated with the objective may be published on the social network feed. Thus, members of an organization may be motivated and encouraged to participate in objectives for the organization. Additionally, members may observe the objectives in the organization and decide to participate and coordinate resources to accomplish objectives.

As an example, a user may use a computing device to provide data regarding an objective to be stored as a data object on a storage medium as well as published on a social network feed. The objective data may include images, text, videos, hyperlinks, and other types of data. Additionally, data including a name of the objective, description, start and/or end dates, key results to complete the objective, contributors or users in the organization participating in accomplishing the objective, and messages associated with the objective may also be provided and stored. Accordingly, the data may be stored in a record associated with the objective. Additionally, a message may be published on a social network feed of a social network that the objective was created or started. Users of the social network may then interact with the objective. For example, users may use a pointing device to select and click-through the displayed objective to an objective details page, post comments in response to the objective, indicate that they "like" the objective, or volunteer to join the objective. The progress of the objective may also be provided in updates published on the social network feed.

In some instances, the objective may be restricted to certain members within an organization. For example, an objective may be private, restricted to certain roles, or restricted to certain groups or sub-groups of users. Feedback regarding the objective may also be collected.

In some implementations, users may set a social relationship to the objective. For example, as previously discussed, a user may commit to the objective, and therefore, participate in accomplishing the objective. Users participating in the objective may also be classified into different social relationships with the objective. For example, users may be committed or assigned to accomplish key results. Some users may be indicated as current contributors, but have not yet been assigned or committed to particular key results. Additionally, users may choose not to contribute to an objective, but may indicate to decide to "watch" the objective, for example, having updates or messages associated with the objective to appear in a social network feed. Additionally, users or members of the organization may choose not to participate in the objective.

Additionally, because users have social relationships with objectives, users in the organization may be tracked to determine what objectives the user is working on. For example, if a user has committed to participating in ten objectives and has been assigned or signed up for seven key objectives within the ten objectives, the information may be provided in a profile or report associated with the user.

In some implementations, the social network feed for users contributing to fewer objectives may emphasize, elevate, or prioritize messages related to the creation of new objectives such that the users may be encouraged to choose to participate in accomplishing objectives. Other types of messages may also be emphasized, elevated, or prioritized. For example, a message associated with another user joining an objective may be emphasized. Additionally, messages associated with others users or members of the organization in the same level of hierarchy, same position titles, or same organizational groups may also be emphasized.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

Online social networks are increasingly becoming a common way to facilitate communication among people who can be recognized as users of a social networking system. Some online social networks can be implemented in various settings, including organizations, e.g., enterprises such as companies or business partnerships, academic institutions, or groups within such an organization.

In some online social networks, users can access one or more social network feeds, which include information updates presented as items or entries in the feed. Such a feed item can include a single information update or a collection of individual information updates. A feed item can include various types of data including character-based data, audio data, image data and/or video data. For example, a post related to an online marketing campaign may appear as a feed item. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

FIG. 1 shows a system diagram illustrating an example of architectural components 100 for managing objectives in an organization in a social network environment according to some implementations. Architectural components 100 in FIG. 1 may provide communications to be transmitted among a variety of different hardware and/or software components. For example, architectural components 100 may include user system 110a, objectives server 105 obtaining and analyzing data from other components, objectives database 120 storing objective records and associated data, including social network data in some implementations, and user system 110b. In some implementations, objectives database 120 may also store user profiles, content including posts, and user interactions associated with objective records.

Objectives server 105 and objectives database 120 may be managed by the same entity. In other implementations, management of the different architectural components 100 may be spread across multiple entities. For example, objectives database 120 may be operated by one entity and objectives server 105 may be operated by another entity.

In some implementations, user system 110a may communicate with objectives server 105. Objectives server 105 may further communicate with additional architectural components, such as objectives database 120 and user system 110b.

Accordingly, various components are able to communicate with each other over the Internet or a combination of networks including the Internet. For example, in an implementation, objectives server 105 may transmit data to and process data received from user system 110a. Objectives server 105 may store data received from user system 110a into objectives database 120. Moreover, objective server 105 may obtain data from objectives database 120 in response to processing data obtained from user system 110a. Objectives server 105 may also transmit data to or obtain data from user system 110b.

As an example, objectives server 105 may receive, from user system 110a, data regarding an objective in an organization. For example, the data may include an objective, such as "Introduce feature X," start and end dates, description of the objective, the visibility of the objective within the organization, key results to achieve the objective, potential contributors, a message to send to contributors to invite them to join the objective, and other types of data. The data regarding the objective may be stored by objectives server 105 on objectives database 120. Additionally, objective server 105 may retrieve and transmit data to user system 110b. For example, data regarding an objective provided by user system 110a may be obtained by user system 110b.

User System 110a and 110b may be any type of computing device. For example, user systems 110a and 110b may be portable electronic devices such as smartphones, tablets, laptops, etc. User systems 110a and 110b may be another server or a desktop computer. Additionally, user systems 110a and 110b may be different types of computing devices. For example, user system 110a may be a desktop computer whereas user system 110b may be a smartphone.

Figure 2:
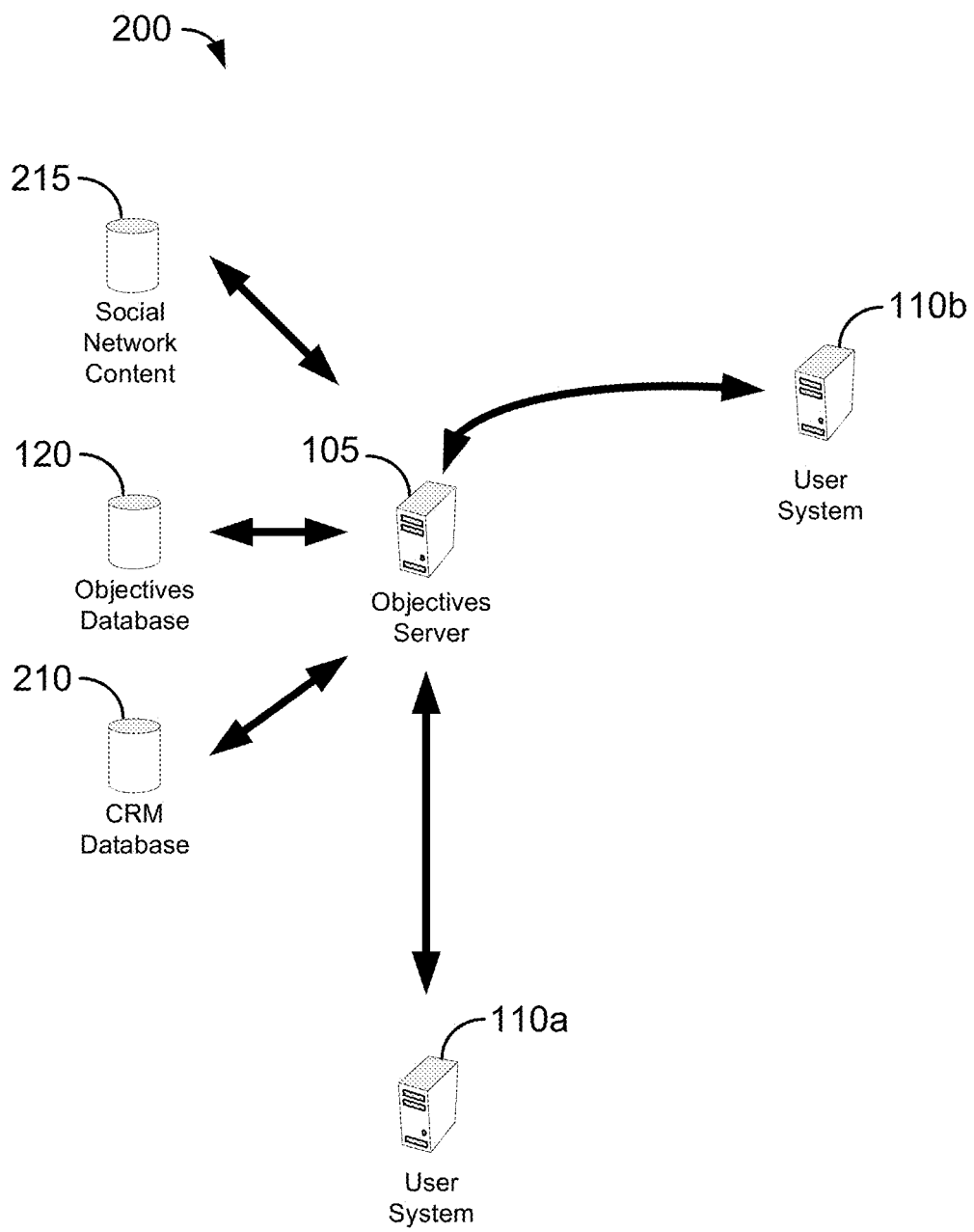
FIG. 2 shows another system diagram of an example of architectural components 200 for managing objectives in an organization in a social network environment according to some implementations.

FIG. 2 shows another system diagram of an example of architectural components 200 for managing objectives in an organization in a social network environment according to some implementations. Architectural components 200 may also provide communications to be transmitted among a variety of different hardware and/or software components. For example, architectural components 200 may include the same components as architectural components 100 as well as CRM database 210 and social network content 215. Accordingly, objectives server may transmit or obtain data from objectives database 120, CRM database 210, and social network content 215.

As an example, objectives server 105 may receive, from user system 110a, data regarding an objective. As previously discussed, the data may be stored in objectives database 120. In the example of FIG. 2, data may also be stored or retrieved from CRM database 210 and social network content 215. For example, an objective and associated data may be received by objectives server 105 from user system 110a and stored in objectives database 120. In some implementations, objectives server 105 may also transmit data to social network server 215. For example, a message may be posted on a social network feed on a social network that an objective was received from user system 110a. In some implementations, user system 110b may interact with the message on the social network. Additionally, objectives server 105 may retrieve and analyze data from CRM database 210. For example, user system 110a may create an objective such as "Generate ten sales leads." Data regarding the objective may be stored in objectives database 120. Content may also be posted on a social network by storing the data in social network content 215. Additionally, objectives server 105 may query CRM database 210 to determine the progress of the objective. For example, CRM database 210 may include sales and marketing data for a user. Objectives server 105 may determine that the objective has progressed a particular amount, and therefore, update the associated data in objectives server 105. Objectives server 105 may also transmit data regarding the progress of the objective to social network content 215. For example, a message may be posted to a social network that the objective is 50% towards completion.

In some implementations, user system 110b may transmit data that another user wishes to participate in the objective. Data regarding the other user may be stored in objectives database 120. Additionally, a message may be posted on the social network feed on the social network hosted by social network content 215 that the other user is now participating in the objective. Any data transmitted among architectural components 200 may be stored or transmitted to one or more of objectives database 120, CRM database 210, and social network content 215.

Figure 3:
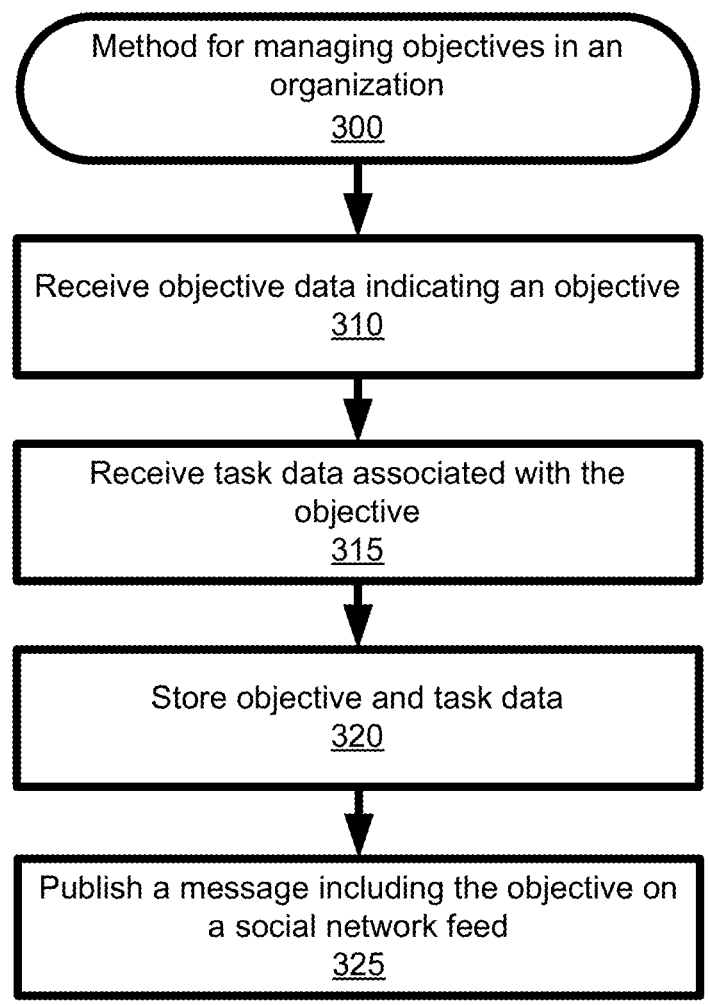
FIG. 3 shows a flowchart of an example of a computer implemented method 300 for managing objectives in an organization in a social network environment in accordance with some implementations.

FIG. 3 shows a flowchart of an example of a computer implemented method 300 for managing objectives in an organization in a social network environment in accordance with some implementations. Method 300 (and other methods described herein) may be implemented by the architectural components of FIGS. 1 and 2. In various implementations, blocks may be reordered, omitted, combined, or split into additional blocks for method 300, as well as other methods described herein.

In block 310, a server, such as objectives server 105, may receive objective data indicating an objective. For example, objective server 105 may receive an objective from user system 110a, such as "Finish tape-out of chip design." Accordingly, the objective data may be obtained from a user system such as user system 110a. Objective server 105 may also store the objective data in objectives database 120.

In block 320, task data associated with the objective may be received. Task data may include tasks needed to complete the objective. For example, if the objective obtained in block 310 is "Finish tape-out of chip design," then tasks "Finish schematics," "Finish physical design," and "Finish pre-silicon characterization" may be indicated as tasks needed to complete the objective.

In block 330, the objective data and task data may be stored on a storage medium. In some implementations, objective data and task data may be stored on objectives database 120 in a record.

In some implementations, additional types of data may be obtained and stored in objectives database 120, CRM database 210, and social network content 215. FIG. 4 shows an example of a graphical user interface (GUI) 400 for creating an objective record according to some implementations. An objective record may include a variety of data regarding the objective. For example, in GUI 400, visibility indicator 405 may indicate the degree of visibility or access to the objective within an organization. In FIG. 4, an objective may be indicated as private or public. If the visibility indicator indicates that the objective is private, then only the user and those invited, as discussed later, may be able to access data regarding the objective. As an example, a private objective may be a one-on-one "coaching" session, such as an objective to improve "Public speaking skills." If the objective is indicated as public, any user within an organization may be able to access the objective. In other implementations, a particular subset of users within the organization may be selected. A user may indicate that the objective shall only be visible to a particular level of hierarchy in the organization. For example, the user may indicate that only "Senior Managers" may be able to view the objective, and therefore, exclude "Managers" at a level in the hierarchy below "Senior Managers" as well as "Directors" at a level above "Senior Managers." Additionally, the visibility indicator may indicate that only users at the same level, one or more levels below, or one or more levels above a particular user or level may be able to access the data related to the objective. In some implementations, the objective may be indicated that only a particular team may view and participate in the objective. For example, only members of a "User Interface" group may be allowed. Accordingly, objectives may be categorized to be limited to at least private, team-based, public, or particular subset of users based upon title, hierarchy, or divisions.

In GUI 400, an objective 410 may be provided to create objective data. Additionally, an objective description 415 may also be provided. In some implementations, an image or avatar may also be selected or uploaded to be associated with the objective.

A start date 420 and end date 425 for an objective may also be provided. In some implementations, start date 420 may be used by objectives server 105 to determine when to send the objective and related data to social network content 215. For example, user system 110*a* may provide data from GUI 400, including an objective 405 and start date 420. Accordingly, data including objective data and start date data may be stored in an objective record in objectives server 120. Upon the start date, objectives server 105 may transmit a message to social network content 215 such that a message on a social network feed on a social network may be posted. As discussed later, the message may include information such as the objective.

Key results 430, 435, and 440 may also be provided by user system 110*a*. Key results may indicate tasks necessary to complete objective 410. For example, as previously discussed, if objective 410 is indicated as "Finish tape-out of chip design," then Key Results 430-440 may indicate tasks "Finish schematics," "Finish physical design," and "Finish pre-silicon characterization" needed, or desired, to complete the objective.

In GUI 400, contributors 445 and 450 may be provided by user system 110*a*. In some implementations, contributors 445 and 450 may be members of the organization who are invited to participate in the objective. In some implementations, users outside of the organization may also be invited to participate. For example, user emails may be provided. In some implementations, user system 110*a* may provide the members. In other implementations, members may be recommended or added by objectives server 105. A user creating an objective may be recommended to include contributors at the same level, particular level, higher level, or lower level of a managerial or organizational hierarchy of the organization the members may be part of, such as the same corporation. In some implementations, users part of the same organizational group as the user may be recommended. For example, an engineer in the "Yield Enhancement" group may be recommended to include other engineers in the group. As another example, the engineer's manager may be recommended. As another example, if the manager of the Yield Enhancement group creates the objective, then the engineers working for the manager in the group may be recommended. In some implementations, the users or members described above may be automatically included to be invited to participate.

Message 455 may be included in an invitation to contributors invited to participate in the objective. The invitation may also include any other data provided by GUI 400 or from objectives server 105, CRM database 210, or social network content 215. For example, the invitation may also include the objective, start and end dates, or other data. Objectives server 105 may transmit message 455, for example, to user system 110*b* indicating that a user has been invited to participate in objective 410.

In some implementations, text, hyperlinks, videos, images, or other types of data useful for the objective may also be provided for in GUI 400.

Figure 5:
FIG. 5 shows an example of a graphical user interface (GUI) 500 of messages on a social network feed according to some implementations.

In block 325, a message including the objective may be published on a social network feed associated with a social network. FIG. 5 shows an example of a graphical user interface (GUI) 500 of messages on a social network feed according to some implementations. In an implementation, when user system 110*a* submits the content of GUI 400, or upon a scheduled start date, a message may be posted on a social network feed, such as a social network feed associated with social network content 215. Accordingly, an objective may be advertised within an organization or member base using a social network associated with social network content 215.

In GUI 500, message 505 includes an objective, for example, submitted by user system 110*a* by transmitting the contents of GUI 400 to objectives server 105. Message 505 may also include a user associated with submitting the objective. As previously discussed with respect to visibility indicator 405, a variety of users of the social network may be able to observe the message in a social network feed. Accordingly, users may join or comment on the objective. For example, in GUI 500 of FIG. 5, messages 510 and 525 indicate that users of the social network have decided to join the objective. Accordingly, when a user receives an invitation to join the objective and proactively decides to join, a message may be published on the social network. As such, other users may see activity related to the objective, and therefore, may decide to participate as well.

In some implementations, messages associated with the objective may also be posted. In GUI 500, messages 515, 520, 530, and 535 include comments regarding the objective. Additionally, users may interact with the objective by indicating that they "like" it by selecting like 540.

In GUI 500, messages, such as contributors joining or comments, are nested beneath and associated with message 505 indicating that an objective has been started. In other implementations, contributors joining the objective or comments related to the objective may not be nested. That is, each may be displayed as an independent message or post published on the social network feed rather than being nested underneath and associated with the original message when the objective was published.

Publishing messages related to an objective may increase the social impact of the objective within the organization. For example, a social impact of an objective may be determined and/or shown by displaying likes, contributors to the objective, and comments related to the objective. As such, users may elect to join the objective upon increased activity on the social network feed for the objective. Moreover, new employees joining an organization may see a variety of objectives within the organization and choose to be proactive and join popular objectives. Additionally, objectives within some departments of the organization may be viewed by employees of different departments. The employees may decide to coordinate, pool resources, and increase organizational efficiency.

In some implementations, objectives may be designated as key objectives, for example, by management of the organization. Accordingly, these objectives may be indicated as important, or given priority in the social network feed. For example, objectives indicated as key or important objectives may include messages posted on a social network feed upon each task or step completed. For objectives not indicated as key or important, messages may only be posted upon a threshold, for example, upon 50% and 100% completion, and so forth. In some implementations, key objectives may also generate posts upon a threshold being reached. Thresholds may include other types of thresholds other than completion. For example, an objective obtaining a certain number of contributors may also generate a message. Additionally, an objective obtaining a certain number of contributors from particular levels of hierarchy within the organization, within a certain team or group, certain titles, and other classifications disclosed herein may also generate a message.

Additionally, for objectives identified as key or important, every contributor joining may generate a message on the social network feed. In some implementations, each message may be an independent message on the feed rather than nested underneath the message associated when the objective was started. Messages associated with a contributor joining a non-key objective may be nested underneath the message associated with the creation of the objective.

Accordingly, certain objectives may be emphasized, and employees or users may be encouraged to participate in certain types of objectives over other types of objectives.

Figure 6:
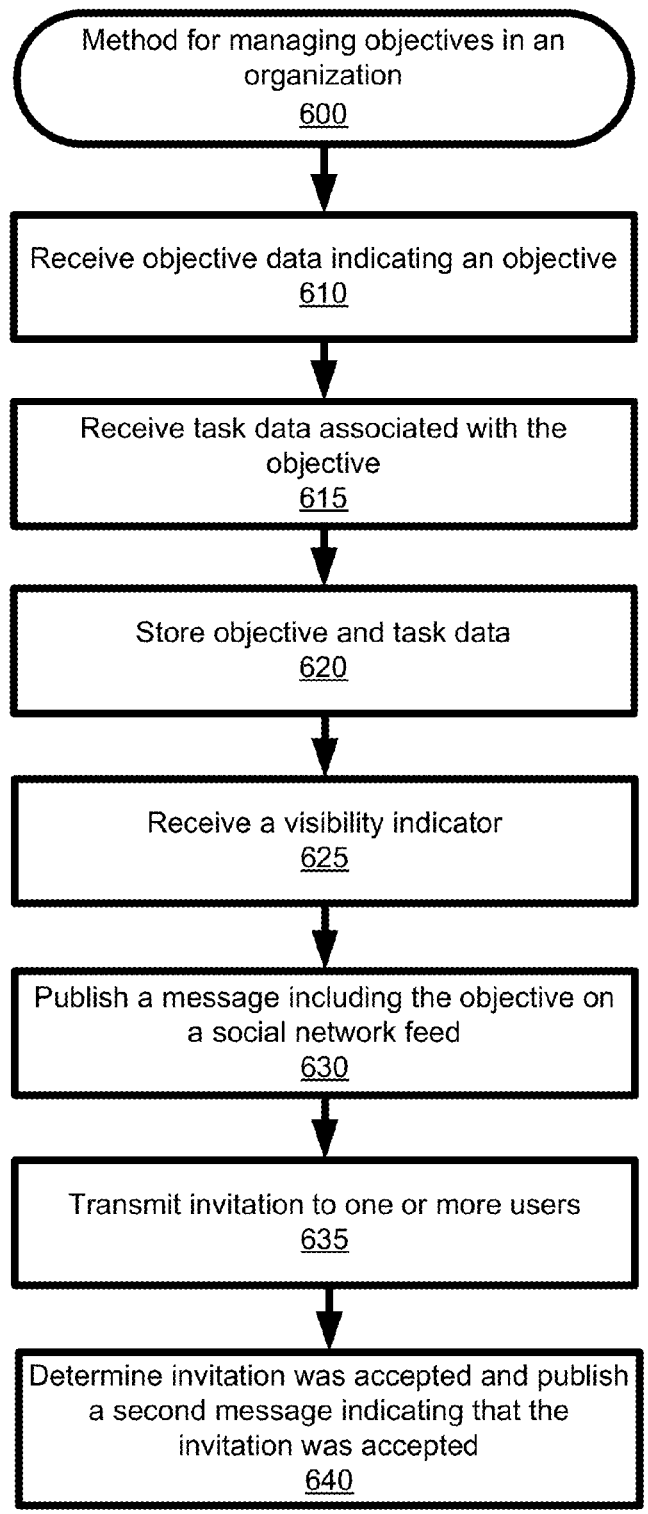
FIG. 6 shows a flowchart of an example of a computer implemented method 600 for managing objectives in an organization in a social network environment in accordance with some implementations.
Figure 8A:
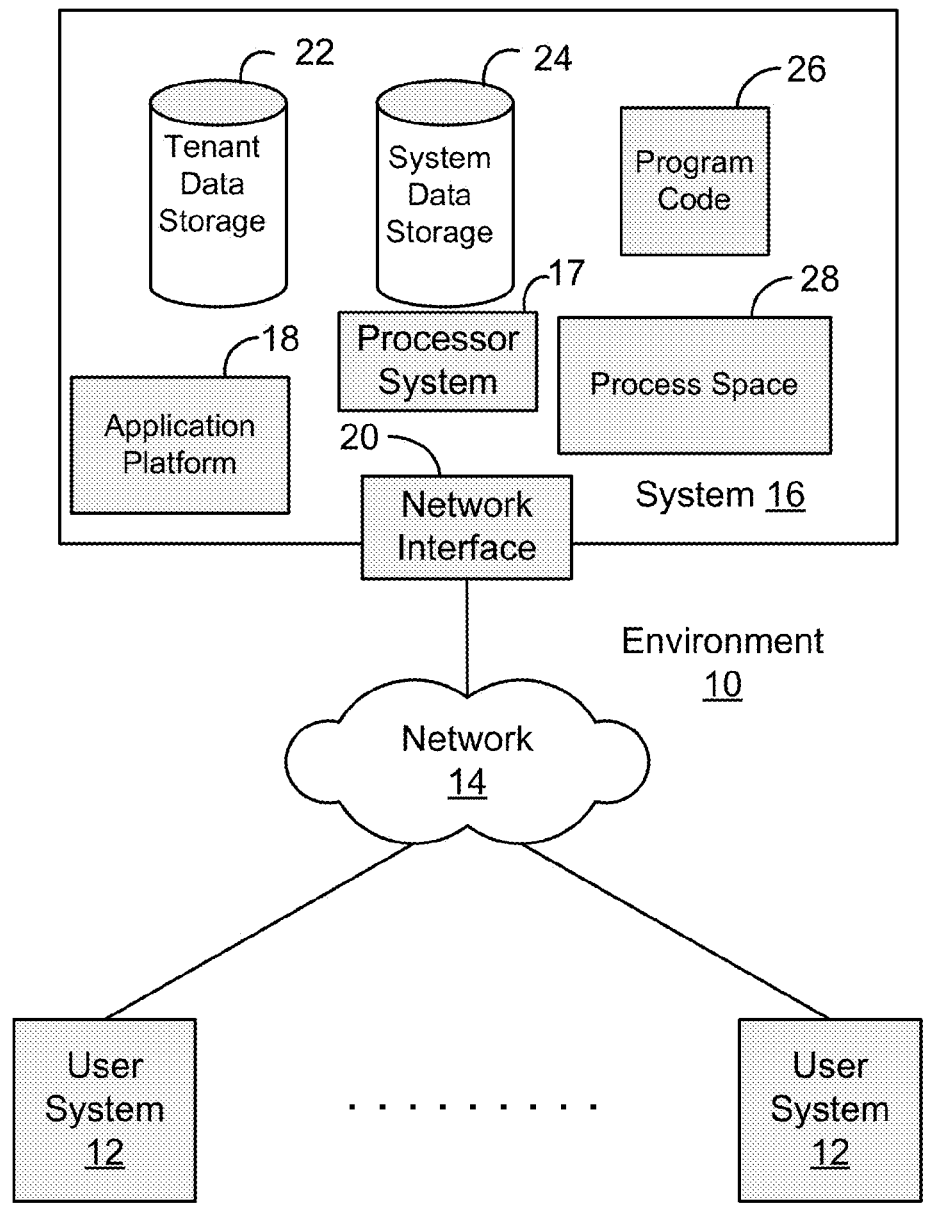
FIG. 8A shows a block diagram of an example of an environment 10 in which an on-demand database service can be used in accordance with some implementations.
Figure 8B:
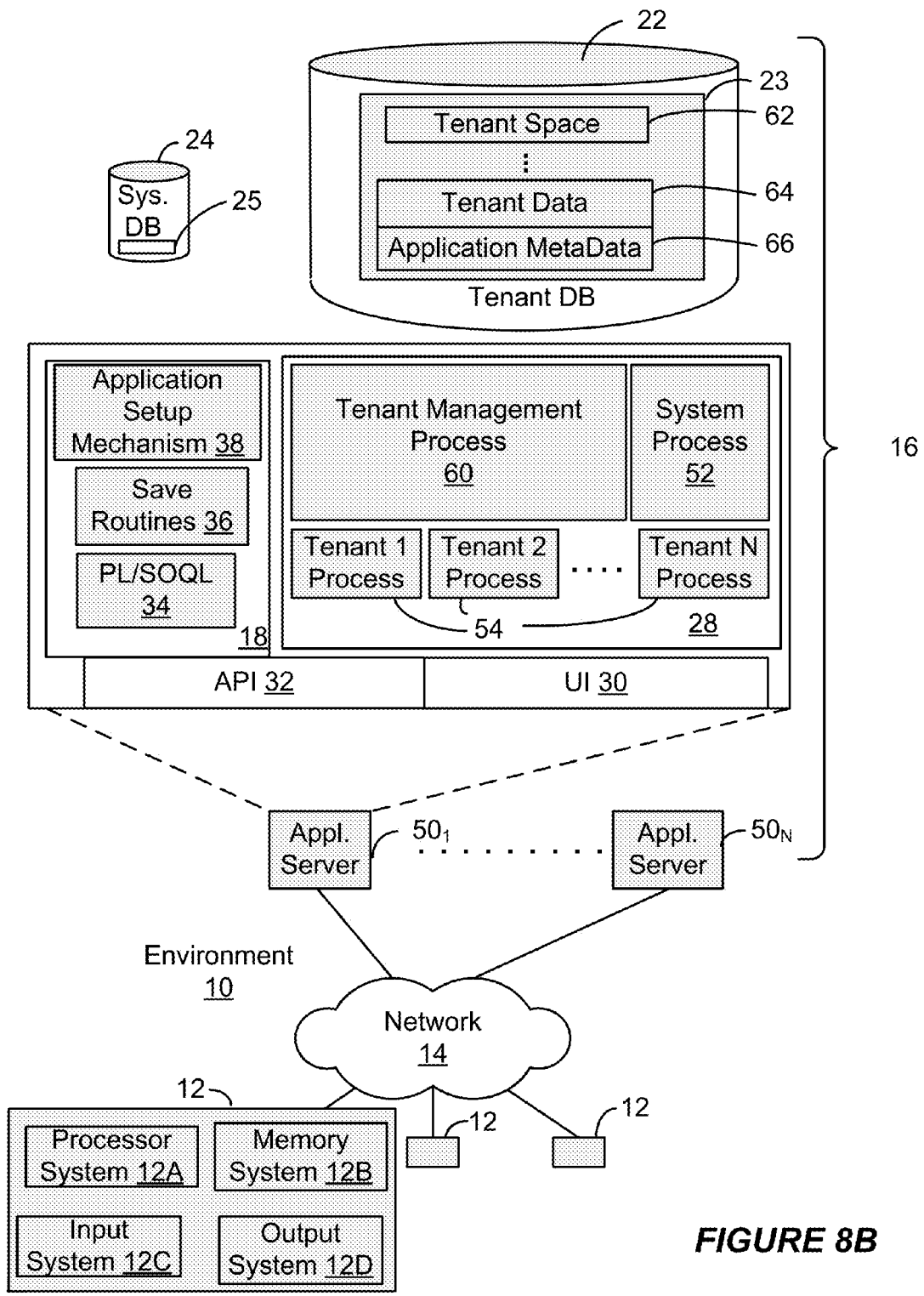
FIG. 8B shows a block diagram of an example of some implementations of elements of FIG. 8A and various possible interconnections between these elements.
Figure 9A:
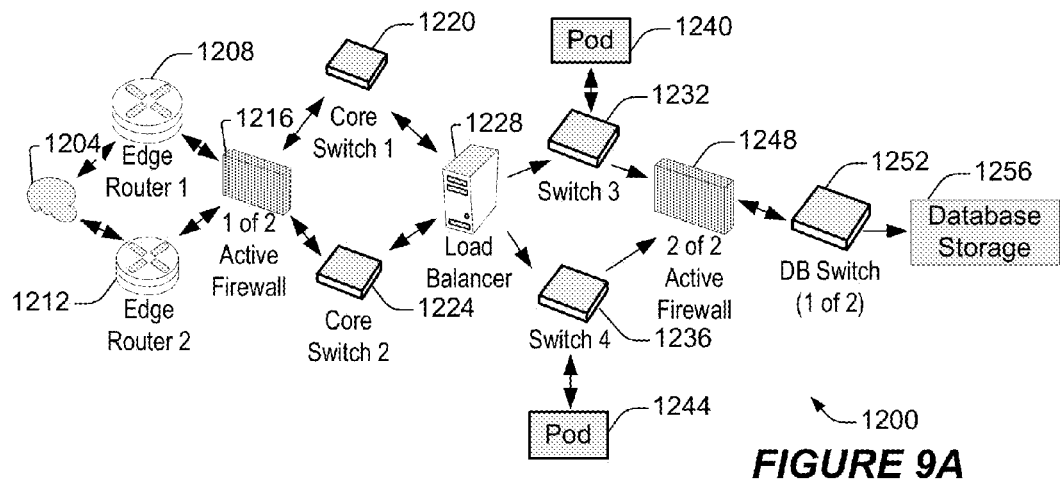
FIG. 9A shows a system diagram illustrating an example of architectural components of an on-demand database service environment 1200 according to some implementations.
Figure 9B:
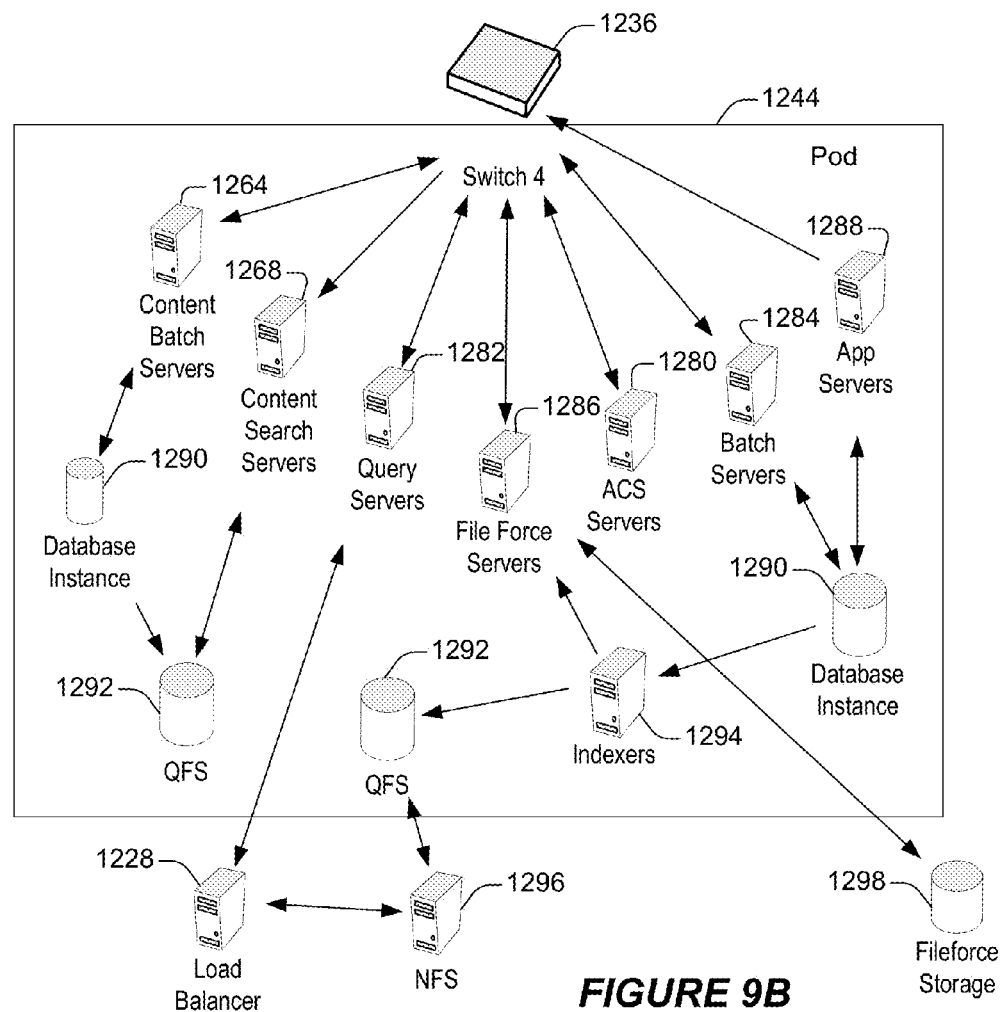
FIG. 9B shows a system diagram further illustrating an example of architectural components of an on-demand database service environment according to some implementations.

FIG. 6 shows a flowchart of an example of a computer implemented method 600 for managing objectives in an organization in a social network environment in accordance with some implementations. In block 610, objective data indicating an objective may be received, as previously discussed. For example, objective data may include a name of an objective, such as "Decrease customer support response time."

In block 615, task data associated with the objective may be received. As previously discussed, task data may include tasks needed to complete the objective. As an example, if the objective is to "Decrease customer support time," tasks may include "Answer calls within an average of five minutes" and "Get to resolution within an average of 10 minutes." In block 620, objective data and task data, as well as any other types of data received by objectives server 105 from user system 110*a* may be stored in objectives server 120.

In block 625, a visibility indicator may be received. In some implementations, a visibility indicator may be provided by visibility indicator 405 in GUI 400. As previously discussed, the visibility indicator may indicate the degree of visibility of the objective. For example, the objective may be indicated as a private objective, and therefore, may not be accessible or visible in a social network feed by those not invited to contribute to the objective. As an example, an employee may wish to have a private coaching objective, such as "Improve public speaking skills" with a mentor, and therefore, may keep the objective as private.

In block 630, a message including the objective may be published on a social network feed, as previously discussed with respect to FIG. 5. The visibility indicator indicates whether a user or set of users may view the data related to the objective or see a message regarding the objective on a social network feed.

In block 635, an invitation may be transmitted to others users within the organization. That is, user system 110*a* may provide an objective and user system 110*b* may receive an invitation to participate in the objective. As previously discussed, users may join the objective and have their participating in the objective included on a social network feed on the social network in order to increase activity, and encourage others to contribute to the objective, related to the objective on the social network.

In block 640, objectives server 105 may receive an indication from user system 110*b* that an invitation to join an objective has been accepted, or that user system 110*b* has decided to join an objective. Accordingly, as previously discussed, a message may be published on the social network feed.

FIG. 7 shows an example of a graphical user interface (GUI) 700 including data from an objective record in accordance with some implementations. GUI 700 displays data associated with an objective, for example, obtained from objectives database 120, CRM database 210, and/or social network content 215.

In some implementations, GUI 700 may be displayed if the visibility indicator of the objective record indicates that the user may access the record. In GUI 700, objective info 705 displays the objective name and type of visibility indicator (e.g., public). Additionally, icon 765 may be associated with the objective. In some implementations, icon 765 may have been selected or uploaded when the objective was created, for example, by submitting GUI 400. Icon 765 may also be displayed with the objective on a social network feed on a social network.

GUI 700 may also include tasks 710, 715, and 720 needed to complete the objective. In some implementations, tasks may include steps needed to complete the tasks. For example, in FIG. 7, steps 725, 730, and 735 are needed to complete task 710. Step 770 is needed to complete task 715. Step 740 is needed to complete task 720. In some implementations, steps 725, 730, 735, 740, 740, and 770 may be provided by GUI 400. In other implementations, the steps may be provided via GUI 700. For example, users participating in the objective may input steps that may lead to the achievement of the task. In GUI 700, steps may also be marked as completed or finished, for example, with completion indicator 745.

In some implementations, each task may be assigned to one or more contributors to the objective. For example, when a user decides to participate in the objective, the user may be added to current contributors 755. Current contributors 755 may be the users participating in trying to complete the objective. Users in current contributors 755 may be assigned to a particular task, for example, by the creator of the objective. In other implementations, users may volunteer to complete particular tasks.

GUI 700 may also include any other data associated with the objective, for example, from objectives database 120, CRM database 210 and/or social network content 215. For example, messages on social network content 215 related to the objective may be included. In objective details 760, additional details from an objective record may be provided. For example, in GUI 700, an objective description and due date may be provided.

In some implementations, progress meter 750 may also be provided. Progress meter 750 may indicate the state of the objective. In an implementation, progress meter 750 may advance upon completion of each step. In other implementations, progress meter 750 may advance upon the completion of each task. When each step of a task is completed, the progress meter may be updated. A progress meter may also be provided for each individual task 710, 715, and 720. For example, in GUI 700 of FIG. 7, each task includes a percentage completion statistic.

In an implementation, a message may be published on a social network feed on a social network if a task and/or step is completed. For example, a message stating "John Doe completed 'Finish schematic design' for 'Finish tape-out of chip design'" may be published on the social network feed. That is, a user identification, completed task, and the objective associated with the task may be published. Accordingly, the "life" and activity of the objective may be followed throughout the course of the objective as it is being accomplished. Additionally, by generating messages for completion of tasks and steps of an objective, others users may be encouraged to join the objective as they view the objective advancing towards completion.

In an implementation, contributors to the objective may provide feedback. GUI 700 may include a feedback button, link, or other interactive object for contributors to provide feedback. In some implementations, when a contributor indicates a task or step is complete, other contributors, such as the creator of the objective or other contributors, may be prompted to provide feedback to the contributor who completed the task or step. Other contributors may provide feedback as the objective is worked upon. That is, feedback may also be provided without completing a particular task or step.

In some implementations, the steps or tasks completed by a contributor may be recorded in a record in a storage medium such as a database. Accordingly, the impact of the contributor on the organization's objectives may be followed in a "reputational profile" including the contributor's actions and related data. For example, the names of the steps or tasks may be recorded. Additionally, the number of tasks and/or steps they have contributed to may be recorded. The number of objectives, as well as a subset of key objectives, they have contributed to may also be recorded. Feedback ratings, rankings, or comments received from other contributors may also be stored. In some implementations, upon completion of the objective, all contributors may be requested to provide feedback on other contributors.

In some implementations, the content in the reputational profile may be used to suggest a contributor to invite to join an objective, for example, when user system 110*a* provides the data from GUI 400.

Additional examples of systems, apparatus, and methods are disclosed herein for implementing enterprise level social and business information networking Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Mechanisms and methods for providing systems implementing enterprise level social and business information networking are disclosed herein with reference to several implementations. Examples of database systems are described and can provide a platform for tracking events related to a record, actions of a user, and messages about a user or record. The disclosed systems support various data structures of feeds, the customization of feeds, selection of records and users to follow, generation of feeds, and display of feeds in suitable presentations on a user's display device.

FIG. 11A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 11A (and in more detail in FIG. 11B) user systems 12 might interact via a network 14 with an on-demand database service, which is implemented in the example of FIG. 11A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 11A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 11A and 11B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 11A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 11B shows a block diagram of an example of some implementations of elements of FIG. 11A and various possible interconnections between these elements. That is, FIG. 11B also illustrates environment 10. However, in FIG. 11B elements of system 16 and various interconnections in some implementations are further illustrated. FIG. 11B shows that user system 12 may include processor system 12A, memory system 12B, input system 12C, and output system 12D. FIG. 11B shows network 14 and system 16. FIG. 11B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 11A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 11B, system 16 may include a network interface 20 (of FIG. 11A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 12A shows a system diagram illustrating an example of architectural components of an on-demand database service environment 1200 according to some implementations. A client machine located in the cloud 1204, generally referring to one or more networks in combination, as described herein, may communicate with the on-demand database service environment via one or more edge routers 1208 and 1212. A client machine can be any of the examples of user systems 12 described above. The edge routers may communicate with one or more core switches 1220 and 1224 via firewall 1216. The core switches may communicate with a load balancer 1228, which may distribute server load over different pods, such as the pods 1240 and 1244. The pods 1240 and 1244, which may each include one or more servers and/or other computing resources, may perform data processing and other operations used to provide on-demand services. Communication with the pods may be conducted via pod switches 1232 and 1236. Components of the on-demand database service environment may communicate with a database storage 1256 via a database firewall 1248 and a database switch 1252.

As shown in FIGS. 12A and 12B, accessing an on-demand database service environment may involve communications transmitted among a variety of different hardware and/or software components. Further, the on-demand database service environment 1200 is a simplified representation of an actual on-demand database service environment. For example, while only one or two devices of each type are shown in FIGS. 12A and 12B, some implementations of an on-demand database service environment may include anywhere from one to many devices of each type. Also, the on-demand database service environment need not include each device shown in FIGS. 12A and 12B, or may include additional devices not shown in FIGS. 12A and 12B.

Moreover, one or more of the devices in the on-demand database service environment 1200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1204 is intended to refer to a data network or plurality of data networks, often including the Internet. Client machines located in the cloud 1204 may communicate with the on-demand database service environment to access services provided by the on-demand database service environment. For example, client machines may access the on-demand database service environment to retrieve, store, edit, and/or process information.

In some implementations, the edge routers 1208 and 1212 route packets between the cloud 1204 and other components of the on-demand database service environment 1200. The edge routers 1208 and 1212 may employ the Border Gateway Protocol (BGP). The BGP is the core routing protocol of the Internet. The edge routers 1208 and 1212 may maintain a table of IP networks or 'prefixes', which designate network reachability among autonomous systems on the Internet.

In one or more implementations, the firewall 1216 may protect the inner components of the on-demand database service environment 1200 from Internet traffic. The firewall 1216 may block, permit, or deny access to the inner components of the on-demand database service environment 1200 based upon a set of rules and other criteria. The firewall 1216 may act as one or more of a packet filter, an application gateway, a stateful filter, a proxy server, or any other type of firewall.

In some implementations, the core switches 1220 and 1224 are high-capacity switches that transfer packets within the on-demand database service environment 1200. The core switches 1220 and 1224 may be configured as network bridges that quickly route data between different components within the on-demand database service environment. In some implementations, the use of two or more core switches 1220 and 1224 may provide redundancy and/or reduced latency.

In some implementations, the pods 1240 and 1244 may perform the core data processing and service functions provided by the on-demand database service environment. Each pod may include various types of hardware and/or software computing resources. An example of the pod architecture is discussed in greater detail with reference to FIG. 12B.

In some implementations, communication between the pods 1240 and 1244 may be conducted via the pod switches 1232 and 1236. The pod switches 1232 and 1236 may facilitate communication between the pods 1240 and 1244 and client machines located in the cloud 1204, for example via core switches 1220 and 1224. Also, the pod switches 1232 and 1236 may facilitate communication between the pods 1240 and 1244 and the database storage 1256.

In some implementations, the load balancer 1228 may distribute workload between the pods 1240 and 1244. Balancing the on-demand service requests between the pods may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248. The database firewall 1248 may act as a computer application firewall operating at the database application layer of a protocol stack. The database firewall 1248 may protect the database storage 1256 from application attacks such as structure query language (SQL) injection, database rootkits, and unauthorized information disclosure.

In some implementations, the database firewall 1248 may include a host using one or more forms of reverse proxy services to proxy traffic before passing it to a gateway router. The database firewall 1248 may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, communication with the database storage 1256 may be conducted via the database switch 1252. The multi-tenant database storage 1256 may include more than one hardware and/or software components for handling database queries. Accordingly, the database switch 1252 may direct database queries transmitted by other components of the on-demand database service environment (e.g., the pods 1240 and 1244) to the correct components within the database storage 1256.

In some implementations, the database storage 1256 is an on-demand database system shared by many different organizations. The on-demand database system may employ a multi-tenant approach, a virtualized approach, or any other type of database approach. An on-demand database system is discussed in greater detail with reference to FIGS. 11A and 11B.

FIG. 12B shows a system diagram further illustrating an example of architectural components of an on-demand database service environment according to some implementations. The pod 1244 may be used to render services to a user of the on-demand database service environment 1200. In some implementations, each pod may include a variety of servers and/or other systems. The pod 1244 includes one or more content batch servers 1264, content search servers 1268, query servers 1282, file force servers 1286, access control system (ACS) servers 1280, batch servers 1284, and app servers 1288. Also, the pod 1244 includes database instances 1290, quick file systems (QFS) 1292, and indexers 1294. In one or more implementations, some or all communication between the servers in the pod 1244 may be transmitted via the switch 1236.

In some implementations, the app servers 1288 may include a hardware and/or software framework dedicated to the execution of procedures (e.g., programs, routines, scripts) for supporting the construction of applications provided by the on-demand database service environment 1200 via the pod 1244. In some implementations, the hardware and/or software framework of an app server 1288 is configured to execute operations of the services described herein, including performance of the blocks of methods described with reference to FIGS. 1-7. In alternative implementations, two or more app servers 1288 may be included and cooperate to perform such methods, or one or more other servers described herein can be configured to perform the disclosed methods.

The content batch servers 1264 may handle requests internal to the pod. These requests may be long-running and/or not tied to a particular customer. For example, the content batch servers 1264 may handle requests related to log mining, cleanup work, and maintenance tasks.

The content search servers 1268 may provide query and indexer functions. For example, the functions provided by the content search servers 1268 may allow users to search through content stored in the on-demand database service environment.

The file force servers 1286 may manage requests for information stored in the Fileforce storage 1298. The Fileforce storage 1298 may store information such as documents, images, and basic large objects (BLOBs). By managing requests for information using the file force servers 1286, the image footprint on the database may be reduced.

The query servers 1282 may be used to retrieve information from one or more file systems. For example, the query system 1282 may receive requests for information from the app servers 1288 and then transmit information queries to the NFS 1296 located outside the pod.

The pod 1244 may share a database instance 1290 configured as a multi-tenant environment in which different organizations share access to the same database. Additionally, services rendered by the pod 1244 may call upon various hardware and/or software resources. In some implementations, the ACS servers 1280 may control access to data, hardware resources, or software resources.

In some implementations, the batch servers 1284 may process batch jobs, which are used to run tasks at specified times. Thus, the batch servers 1284 may transmit instructions to other servers, such as the app servers 1288, to trigger the batch jobs.

In some implementations, the QFS 1292 may be an open source file system available from Sun Microsystems® of Santa Clara, Calif. The QFS may serve as a rapid-access file system for storing and accessing information available within the pod 1244. The QFS 1292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1268 and/or indexers 1294 to identify, retrieve, move, and/or update data stored in the network file systems 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information to access files over a network in a manner similar to how local storage is accessed.

In some implementations, queries from the query servers 1222 may be transmitted to the NFS 1296 via the load balancer 1228, which may distribute resource requests over various resources available in the on-demand database service environment. The NFS 1296 may also communicate with the QFS 1292 to update the information stored on the NFS 1296 and/or to provide information to the QFS 1292 for use by servers located within the pod 1244.

In some implementations, the pod may include one or more database instances 1290. The database instance 1290 may transmit information to the QFS 1292. When information is transmitted to the QFS, it may be available for use by servers within the pod 1244 without using an additional database call.

In some implementations, database information may be transmitted to the indexer 1294. Indexer 1294 may provide an index of information available in the database 1290 and/or QFS 1292. The index information may be provided to file force servers 1286 and/or the QFS 1292.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for managing objectives of an organization, the system comprising:
    a database system implemented using a server system, the database system configurable to cause:
        processing objective data indicating a first objective of a first user affiliated with the organization;
        processing task data indicating a plurality of first tasks to be performed to accomplish the first objective;
        sharing, on a social network feed of an enterprise social networking system provided for use by a plurality of users affiliated with the organization, a feed item comprising a graphical representation of the first objective, the feed item being displayable on display devices of the users for each user to submit social network commentary on the feed item and for each user to selectively join the first objective and selectively contribute to performing one or more of the first tasks, the graphical representation of the first objective comprising a progress indicator indicating a measure of a state of completion of the first tasks;
        identifying one or more second users affiliated with the organization to invite to contribute to performing the one or more first tasks, the identifying of the one or more second users being based on one or more second tasks being at least partially performed by the one or more second users in relation to one or more second objectives; and
        sharing one or more electronic invitations with the one or more second users, the one or more electronic invitations comprising or referencing information requesting a second user to contribute to performance of the one or more first tasks.

2. The system of claim 1, the database system further configurable to cause:
    processing a visibility indicator associated with the first objective, the visibility indicator indicating a degree of visibility of the first objective in social network feeds of users affiliated with the organization.

3. The system of claim 2, wherein the degree of visibility indicates that the first objective is private.

4. The system of claim 2, wherein the degree of visibility indicates that the first objective is visible to users within a level of hierarchy in the organization.

5. The system of claim 2, wherein the degree of visibility indicates that the first objective is visible to all users in the organization.

6. The system of claim 1, the database system further configurable to cause:
    determining that the one or more second users has accepted the one or more electronic invitations; and
    causing a message comprising an indication that the one or more second users has accepted the one or more electronic invitations to be shared on the social network feed.

7. The system of claim 6, wherein the message identifies the first objective.

8. The system of claim 1, the database system further configurable to cause:
    determining that at least one task associated with the first objective is indicated as completed; and
    sharing a message identifying the at least one task and the first objective on the social network feed.

9. The system of claim 8, the database system further configurable to cause:
    determining that at least one task of the one or more first tasks is completed by one or more of the second users; and
    transmitting a feedback request to the first user.

10. The system of claim 1, wherein the identifying comprises:
    identifying that the one or more second users are at a first level of hierarchy in the organization, the first user at a second level of hierarchy in the organization, the first level being at a lower level of the hierarchy than the second level.

11. The system of claim 1, wherein the identifying comprises:
    identifying that the one or more second users are at a first level of hierarchy in the organization, the first user at a second level of hierarchy in the organization, the first level being at a higher level of the hierarchy than the second level.

12. The system of claim 1, further comprising:
    sharing a first message identifying the first objective on the social network feed on a start date associated with the first objective.

13. The system of claim 12, wherein the first objective is associated with an avatar associated with the sharing of the first message.

14. The system of claim 1, the database system further configurable to cause:
    determining that a progress of accomplishing the first objective has reached a threshold level of accomplishment; and
    causing a message indicating that the first objective has reached the threshold level of accomplishment to be shared on the social network feed.

15. The system of claim 1, the database system further configurable to cause:
    determining that the first objective has reached a threshold number of contributors; and
    causing a message indicating that the first objective has reached the threshold number of contributors to be shared on the social network feed.

16. A method for managing objectives of an organization using a database system, the method comprising:

processing, using the database system, objective data indicating a first objective of a first user affiliated with the organization;

processing, using the database system, task data indicating a plurality of first tasks to be performed to accomplish the first objective;

causing sharing, on a social network feed of an enterprise social networking system provided for use by a plurality of users affiliated with the organization, of a feed item comprising a graphical representation of the first objective, the feed item being displayable on display devices of the users for each user to submit social network commentary on the feed item and for each user to selectively join the first objective and selectively contribute to performing one or more of the first tasks, the graphical representation of the first objective comprising a progress indicator indicating a measure of a state of completion of the first tasks;

identifying, using the database system, one or more second users affiliated with the organization to invite to contribute to performing the one or more first tasks, the identifying of the one or more second users being based on one or more second tasks being at least partially performed by the one or more second users in relation to one or more second objectives; and causing one or more electronic invitations to be shared with the one or more second users, the one or more electronic invitations comprising or referencing information requesting a second user to contribute to performance of the one or more first tasks.

17. A non-transitory computer readable medium having instructions stored thereon for managing objectives of an organization using a database system implementing an enterprise social networking system, the instructions executable by a processor and configured to cause:

processing objective data indicating a first objective of a first user affiliated with the organization;

processing task data indicating a plurality of first tasks to be performed to accomplish the first objective;

sharing, on a social network feed of an enterprise social networking system provided for use by a plurality of users affiliated with the organization, a feed item comprising a graphical representation of the first objective, the feed item being displayable on display devices of the users for each user to submit social network commentary on the feed item and for each user to selectively join the first objective and selectively contribute to performing one or more of the first tasks, the graphical representation of the first objective comprising a progress indicator indicating a measure of a state of completion of the first tasks;

identifying one or more second users affiliated with the organization to invite to contribute to performing the one or more first tasks, the identifying of the one or more second users being based on one or more second tasks being at least partially performed by the one or more second users in relation to one or more second objectives; and sharing one or more electronic invitations with the one or more second users, the one or more electronic invitations comprising or referencing information requesting a second user to contribute to performance of the one or more first tasks.

18. The non-transitory computer readable medium of claim 17, the instructions further configured to cause:

processing a visibility indicator associated with the first objective, the visibility indicator indicating a degree of visibility of the first objective in social network feeds of users affiliated with the organization.

19. The non-transitory computer readable medium of claim 17, the instructions further configured to cause:

determining that the one or more second users has accepted the one or more electronic invitations; and causing a message comprising an indication that the one or more second users has accepted the one or more electronic invitations to be shared on the social network feed.

20. The non-transitory computer readable medium of claim 17, the instructions further configured to cause:

determining that at least one task associated with the first objective is indicated as completed; and sharing a message identifying the at least one task and the first objective on the social network feed.

21. The non-transitory computer readable medium of claim 17, the instructions further configured to cause:

determining that at least one task of the one or more first tasks is completed by one or more of the second users; and transmitting a feedback request to the first user.

22. The non-transitory computer readable medium of claim 17, wherein the identifying comprises:

identifying that the one or more second users are at a first level of hierarchy in the organization, the first user at a second level of hierarchy in the organization, the first level being at a lower level of the hierarchy than the second level.

23. The non-transitory computer readable medium of claim 17, wherein the identifying comprises:

identifying that the one or more second users are at a first level of hierarchy in the organization, the first user at a second level of hierarchy in the organization, the first level being at a higher level of the hierarchy than the second level.

24. The non-transitory computer readable medium of claim 17, the instructions further configured to cause:

sharing a first message identifying the first objective on the social network feed on a start date associated with the first objective.

25. The non-transitory computer readable medium of claim 17, the instructions further configured to cause:

determining that a progress of accomplishing the first objective has reached a threshold level of accomplishment; and causing a message indicating that the first objective has reached the threshold level of accomplishment to be shared on the social network feed.

26. The non-transitory computer readable medium of claim 17, the instructions further configured to cause:

determining that the first objective has reached a threshold number of contributors; and causing a message indicating that the first objective has reached the threshold number of contributors to be shared on the social network feed.

* * * * *